L. H. PERLMAN.
WHEEL.
APPLICATION FILED AUG. 25, 1916.
1,374,100.
Patented Apr. 5, 1921.
2 SHEETS—SHEET 2.
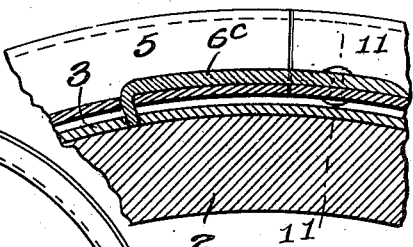
Fig. 10.
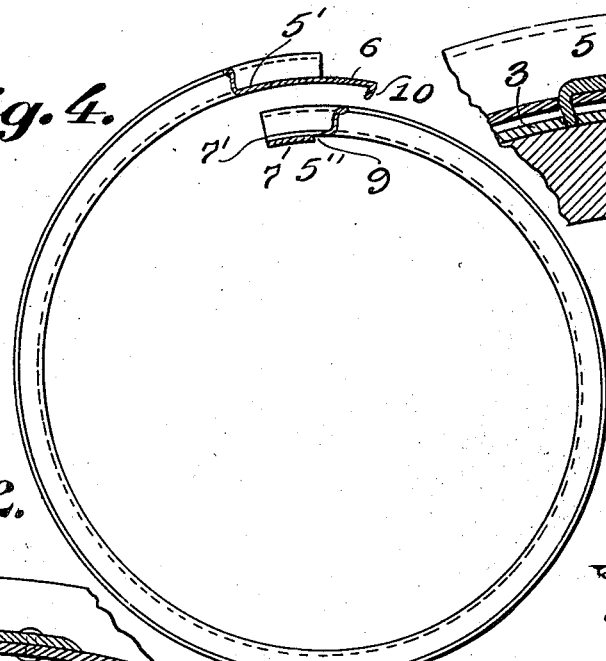
Fig. 4.
Fig. 12.
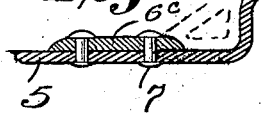
Fig. 11.
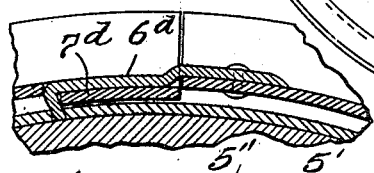
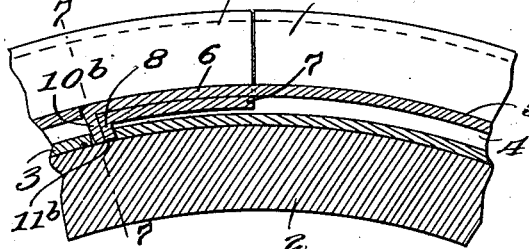
Fig. 6.
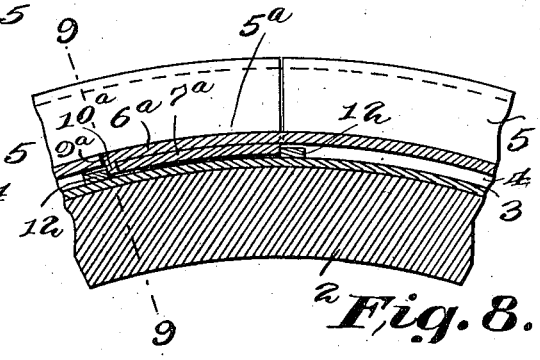
Fig. 8.
Fig. 5.   Fig. 7.   Fig. 9.
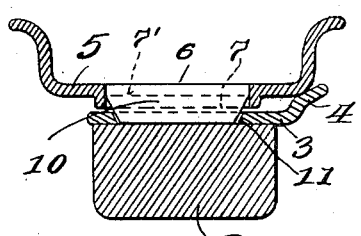 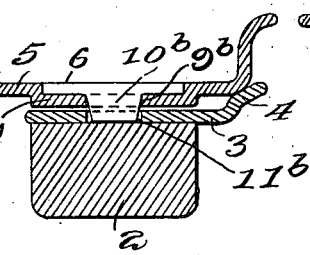 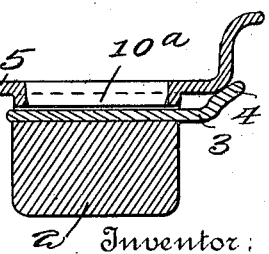
Witnesses
H. H. Lybrand
C. H. Fisler
Inventor:
Louis H. Perlman,
By Edgar M. Kitchin
his Attorney.

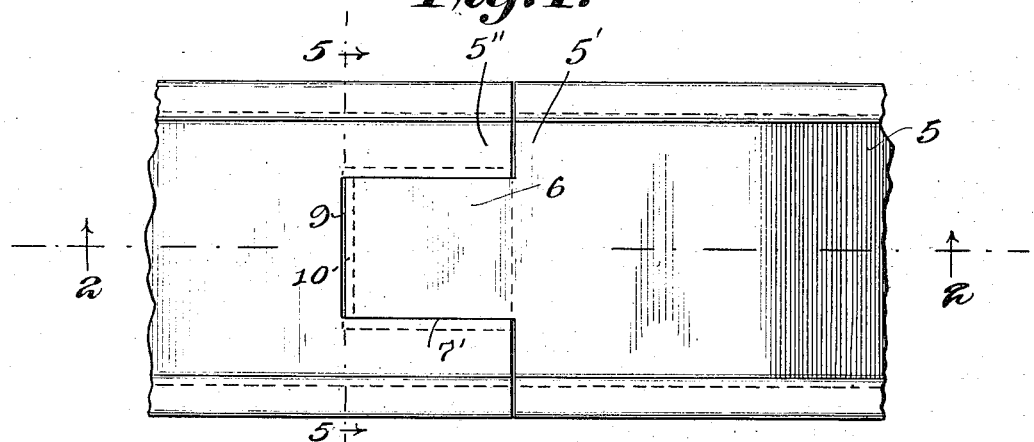
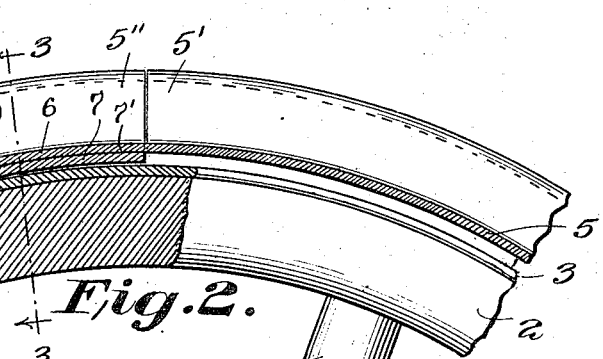
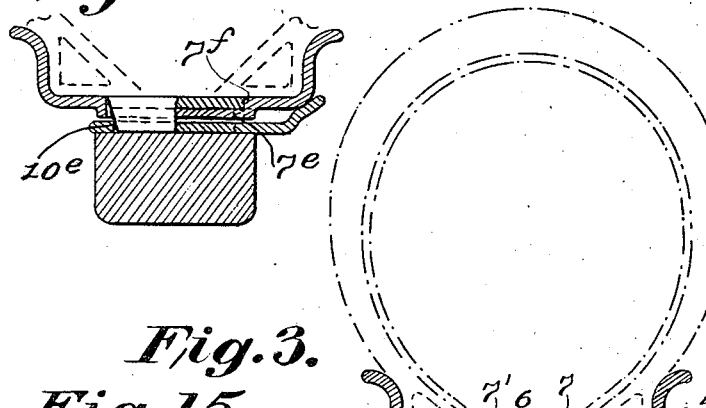
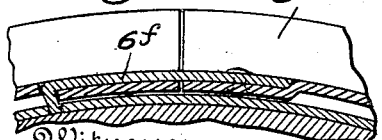
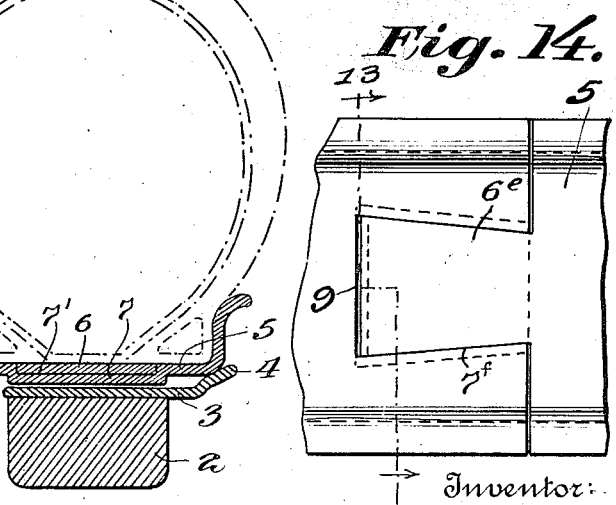

UNITED STATES PATENT OFFICE.

LOUIS H. PERLMAN, OF NEW YORK, N. Y.

WHEEL.

1,374,100.  Specification of Letters Patent.  Patented Apr. 5, 1921.

Application filed August 25, 1916. Serial No. 116,855.

*To all whom it may concern:*

Be it known that I, LOUIS H. PERLMAN, a citizen of the United States, residing at New York city, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in demountable rim wheels of the class particularly well adapted for use on automobiles and like vehicles.

An object in view is to provide means for the ready application of a tire to a demountable rim and removal thereof with the greatest facility and ease and without sacrificing the stability of the rim.

A further and more detailed object in view is to provide means for effectively locking together the ends of a cross cut demountable rim and the use of the locking means as a driver.

With these and further objects in view, as will in part hereinafter be specified and in part become apparent, the invention comprises certain novel constructions, combinations and arrangements of parts as subsequently specified and claimed.

In the accompanying drawings,—

Figure 1 is a fragmentary plan view of part of a demountable rim embodying the features of the present invention.

Fig. 2 is a transverse axial section taken on the plane indicated by line 2—2 of Fig. 1, a fragment of a wheel body being shown and part thereof being seen in section for disclosing the driving connection between the demountable rim and wheel body.

Fig. 3 is a cross section taken on the plane indicated by line 3—3 of Fig. 2.

Fig. 4 is a view in side elevation of a rim embodying the features of the present invention, the rim being seen detached and the ends of the rim sprung to that relative position with respect to each other effecting a contracting of the diameter of the rim sufficient for enabling removal and application of a tire, parts being broken away at the end portions of the rim for disclosing the structural formation of the rim end locking means.

Fig. 5 is a cross section taken on the plane indicated by line 5—5 of Fig. 1 and looking in the direction indicated by the arrow.

Figs. 6, 8, 10 and 12 are views similar to Fig. 2 of very slightly modified embodiments.

Figs. 7 and 9 are cross sections taken, respectively, on the plane indicated by line 7—7 of Fig. 6, and on the plane indicated by line 9—9 of Fig. 8.

Fig. 11 is a fragmentary cross section taken approximately on the plane indicated by line 11—11 of Fig. 10.

Fig. 13 is a cross section taken approximately on the planes indicated by line 13—13 of Fig. 14.

Fig. 14 is a view similar to Fig. 1 of a slightly modified embodiment.

Fig. 15 is a view similar to Fig. 12 of a further embodiment of the invention.

Referring to the drawings by numerals, 1 indicates the spoke of the usual wheel body, and 2 the wood felly which is provided with the usual felly band or fixed rim 3. The felly band 3, at the inner face of the wheel, is provided with an outstanding supporting stop flange 4 (see Fig. 3) against which the inner edge of the demountable rim 5 is adapted to rest. The outer edge of the rim 5 is engaged by the well known side wedges or other like locking elements, not illustrated.

The rim 5 is provided with the usual tire-engaging flanges which are of any standard contour adapting them to receive and retain the usual tire beads. The conventional "straight side" flanges are illustrated, but any other well known form may be substituted without varying the invention. Tires provided with non-elastic beads are adapted for use with the rim 5, and since the beads are of a diameter substantially equal to the diameter of the outer face of the rim 5, said beads cannot be forced over the retaining side flanges of the rim. It is quite common in structures of this class to overcome this difficulty by cutting the rim transversely so that one end of the rim may be sprung from the other and thus the diameter of the rim may be reduced until the diameter of the outer edges of the retaining flanges of the rim is less than the diameter of the non-elastic beads of the tire. The said tire can then be readily placed in a position surrounding the rim. The lapping ends of the rim may then be brought back to an alined position, which operation expands the rim to a position snugly fitting and sustaining the tire. It is also common practice in the demountable rim art of this type to spring one end of the rim past the other radially inward and then to swing the inwardly sprung end axially away from the other end, and then to withdraw the tire with a movement similar to unscrewing an external thread from an internal thread, and a tire may be replaced on the rim by a converse operation of the parts.

The rim 5 is cross-cut forming the ends 5' and 5''. The end 5' is provided with a centrally located circumferentially-extending integral tongue 6 and the end portion 5'' is formed with a depression or recess 7' adapted to snugly receive the tongue 6, the material of the rim at the place of the depression being stamped or otherwise pressed radially inward, forming an offset portion 7. The under face of the tongue 6 rests against the upper face of the offset portion 7 and the offset is of sufficient depth to allow the outer face of tongue 6 to extend flush with the outer face of the balance of the rim. The material at the inner end of the offset portion 7 is slotted at 9. The free end of the tongue 6 is bent to form a radially inward extension 10 adapted to extend through slot 9. Extension 10 is of sufficient length to extend radially inward beyond the inner face of the rim and to enter a recess 11 formed in the felly band 3 so as to serve as a driver to prevent circumferential creeping of the rim 5 on the wheel. The extension or projection 10 is inclined, as clearly seen in Fig. 2, in the direction for slightly lapping and underhanging the end of offset 7, and thereby more effectively locking the parts together.

In operation, when the rim 5 is demounted and it is desired to remove the same from the tire, or, in other words, to remove the tire from the rim, the end 5'' is depressed or forced radially inward until it is freed from the projection 10, and then it is depressed further inward until it may be swung axially free of the tire so that the rim can be removed from the tire. Or in lieu of this operation, the end 5'' may be depressed and, by the use of a suitable operating tool, (not shown) forced to a position where it is overlapped by the end portion 5' to an extent sufficiently contracting the effective diameter of the rim to enable the rim to be withdrawn from the tire, such a position being indicated in Fig. 4. A new tire is placed on the rim by converse operation to that by which the injured tire was removed.

As seen clearly in Fig. 5, the projection 10 is preferably tapered to facilitate passage through the slot 9 and into the recess 11, but may be made straight, as seen in Figs. 8 and 9, as hereinafter described; or may be reduced in length as seen in Figs. 6 and 7. In Figs. 6 and 7 is seen a slightly modified embodiment of the structure seen in Fig. 1, differing therefrom only in the fact that the projection $10^b$ is of less length than projection 10, and the slot $9^b$ and recess $11^b$ are correspondingly reduced, and in the further fact that the material of the felly band, at the point where the slot $9^b$ is formed, is struck down to form a projection 8 parallel to the projection $10^b$. The projections 8 and $10^b$ correspond in length and both extend into the recess $11^b$ to serve as a driver. The other details of the structure seen in Figs. 6 and 7 being identical with those above described, the same description is applicable and the same reference numerals have been applied.

In Figs. 8 and 9 I have illustrated a further embodiment of the invention identical in every respect to that described with respect to Figs. 1, 2 and 3, except that the driving connection is provided without the formation of a recess or pocket in the felly band to receive the driver. The same form of wheel body and felly band are employed, and the felly band is provided with driving lugs 12, 12, outstanding from the felly band and appropriately fixed thereto. Lugs 12 may, of course, be formed integral with the felly band, as by being stamped up therefrom. Between the lugs 12, during operation, lies the depressed portion $7^a$ of one end of the demountable rim $5^a$. The other end of the said demountable rim is provided with a tongue $6^a$ fitting within the depression above the depressed portion $7^a$, the said tongue being provided with a radially inwardly-extending projection $10^a$ extending through an aperture $9^a$ formed in the rim for accommodating the projection. The projection $10^a$ laps the inner end of the depressed portion $7^a$ and slightly underhangs the same and is disposed to abut against one of the lugs 12. The rim $5^a$ is retained at one side by the stop flange of the felly band and the other side by the usual wedge locking elements not illustrated. The operation of this embodiment is substantially the same as those above described.

A further embodiment of the invention is illustrated in Figs. 10 and 11, wherein the tongue $6^c$ is shown as applied to a cross cut channel demountable rim, the tongue being formed of a separate plate and riveted to one end portion of the rim and extending within the channel in position for overlapping the adjacent end portion. The tongue $6^c$ has its edges preferably rounded, as clearly seen in Fig. 11, to present smooth surfaces to those portions of the tire or tube which may engage the tongue, since the tongue is not located in a depression. The structure is otherwise like that described with respect to Figs. 1 and 3 inclusive, and the same reference numerals have been applied to the drawing and the same description is applicable. It is to be noted that since the tongue 6ᶜ is a separate element, it may be made of thicker material than the rim 5 and thus provide additional stability to the parts even though the material of the rim may be comparatively thin.

In Fig. 12 is illustrated a further embodiment corresponding to the structure seen in Figs. 10 and 11, to the extent that the tongue 6ᵈ is not integral with the demountable rim, but differing therefrom in the fact that the tongue 6ᵈ is offset in the line of the cross-cut of the rim so that a portion of the tongue may rest in a recess in the engaged end portion, the said engaged end portion being recessed and formed with a depressed portion 7ᵈ. The structure otherwise corresponds with the structure seen in Figs. 10 and 11.

In Figs. 13 and 14 is illustrated a structure corresponding in form and function exactly with that described in Fig. 1, except that the tongue 6ᵉ is flared outwardly from the end portion of the rim and the recess 7ᶠ is correspondingly tapered, the depressed portion 7ᵉ being, of course, correspondingly tapered so that a dovetail joint is provided between the tongue 6ᵈ and its engaged recess. The advantage of this joint resides in the fact that stresses to which the rim 5 is subjected under the action of the locking wedges, which stresses tend to open the rim at its joint and to expand the rim circumferentially, are resisted by the engagement of the edge walls of tongue 6ᵉ against the edge walls of the recess 7ᶠ, so that circumferential stress on the tongue 6ᵉ is not all delivered directly to the projection 10ᵉ which extends from the free end of the tongue 6ᵉ and serves as a driver. The structure is otherwise identical with that seen in Fig. 1 and the same reference numerals have been applied and the same description is applicable.

By reference to Figs. 3, 11 and 13 it will be perfectly clear that the edges of the tongue in each instance lie beneath the hard marginal beads of the tire carried by the demountable rim; and where the tongue lies in a recess, as in all the structures except that seen in Fig. 10, the edges of the recess also lie beneath the marginal beads of the tire. Thus the inner tube does not strike these edges. Only a very small portion of the end edge of the tongue is exposed to the inner tube.

In Fig. 15 is seen a structure similar to that seen in Fig. 12, and differing therefrom only in that the tongue 6ᶠ instead of being bent and offset is substantially straight, curving, of course. to conform to the curvature of the rim 5ᵉ, the attached end of the tongue 6ᶠ being accommodated by a depression in the engaged end of the rim so as to leave the tongue 6ᶠ with its outer surface flush with the outer surface of the base of the rim throughout the entire length of the tongue.

The tire bead engaging flanges of the demountable rim in each instance are shown herein to be of the type known as "straight side," but obviously so far as the present invention is concerned they could be of the clencher type as it is only essential that the demountable rim shall be of the channel type without reference to the exact detail of the tire engaging flanges.

It should be noted that the feature of dovetailing the joint to form a mortise and tenon joint, as shown in Fig. 14, is applicable to all of the structures disclosed herein, with the possible exception of that seen in Figs. 10 and 11.

What I claim is:—

1. In a wheel structure, a demountable rim of the channel type having a cross-cut, one of the ends resulting from the cross-cut being formed with a projecting tongue and the other with a corresponding recess for receiving the tongue and enabling it to lie with its outer face flush with the main outer surface of the base of the channel, the tongue having an inwardly extending projection, and means coöperating with the projection for connecting the rim ends against circumferential separation, the projection being of sufficient length to extend inwardly beyond the inner face of the rim.

2. In a wheel structure, a demountable rim of the channel type having a cross cut, one of the ends resulting from the cross cut being formed with a projecting tongue and the other with a corresponding recess enabling the tongue to lie with its outer face flush with the main outer surface of the base of the channel, the rim being formed with an aperture at the inner terminus of the recess and the tongue being formed with a projection extending through the aperture.

3. In a wheel structure, a demountable rim of the channel type having a cross cut, one of the ends resulting from the cross cut being formed with a projecting tongue and the other with a corresponding recess enabling the tongue to lie with its outer face flush with the main outer surface of the base of the channel, the rim being formed with an aperture at the inner terminus of the recess and the tongue being formed with a projection extending through the aperture a distance sufficient to form a driver.

4. In a wheel structure, a demountable rim of the channel type having a cross cut, one of the ends resulting from the cross cut being formed with a projecting tongue and the other with a corresponding depression adapted to receive the tongue and enabling the tongue to lie with its outer face flush with the main outer surface of the base of the channel, and means connecting the ends against circumferential separation, the material of the rim at the depression being offset inward in position for serving as a driver.

5. In a wheel structure, a demountable rim of the channel type having a cross cut, one of the ends resulting from the cross cut being formed with a projecting tongue and the other with a corresponding recess enabling the tongue to lie with its outer face flush with the main outer surface of the base of the channel, the rim being formed with an aperture at the inner terminus of the recess and the tongue being formed with a projection extending through the aperture and positioned to overhang a portion of the material of the rim.

6. In a wheel structure, a demountable rim of the channel type having a cross cut, one end of the rim formed by the cross cut being provided with a circumferentially extending tongue and the other end being formed with a depression adapted to receive the tongue, the offset material of the rim incident to the depression being formed with an inwardly extending projection, the rim being formed with an aperture adjacent said projection and the tongue being formed with a projection extending through said aperture and substantially parallel with the first mentioned projection, the two projections extending a distance sufficient to serve as a driver.

7. In a wheel structure, a cross cut demountable rim of the channel type, a tongue extending from one of the ends of the rim in position for engaging the other end of the rim and having a projection adapted to extend from outside inward through the base of the rim to serve as a rim-end connector.

8. In a wheel structure, a cross-cut demountable rim of the channel type, a tongue extending from one of the ends of the rim in position for engaging the other end of the rim, the latter end being formed with a depression shaped from the material of the rim to receive the tongue and allow the tongue to lie with its outer face substantially flush with the outer surface of the base of the rim, and the tongue having a projection adapted to extend from outside of the material of the base of the depression through such material to serve as a rim-end connector.

9. In a wheel structure, the combination with a wheel body having a driving recess, of a cross cut demountable rim of the channel type, and a tongue extending from one of the ends of the rim into engagement with the other end of the rim, the tongue having a projection extending through the web of the engaged end portion and into the recess of the wheel body.

10. In a wheel structure, a cross cut demountable rim of the channel type having a dovetail depression in one of its end portions forming a mortise, the material of the rim being retained integral at the place of the depression and shaped to form the depression, and a tongue outstanding from the other end portion of the rim and shaped to fit within the depression.

In testimony whereof I affix my signature in presence of two witnesses.

LOUIS H. PERLMAN.

Witnesses:
  A. D. TREMPE,
  HENRY T. KIEF.